(12) United States Patent
Friedrich et al.

(10) Patent No.: US 11,947,910 B2
(45) Date of Patent: Apr. 2, 2024

(54) DEVICE AND METHOD FOR DETERMINING AT LEAST ONE PART OF A KNOWLEDGE GRAPH

(71) Applicant: Robert Bosch GmbH, Stuttgart (DE)

(72) Inventors: Annemarie Friedrich, Weil der Stadt (DE); Heike Adel-Vu, Stuttgart (DE); Johannes Christoph Hingerl, Biberach an der Riss (DE)

(73) Assignee: ROBERT BOSCH GMBH, Stuttgart (DE)

( * ) Notice: Subject to any disclaimer, the term of this patent is extended or adjusted under 35 U.S.C. 154(b) by 453 days.

(21) Appl. No.: 17/314,972

(22) Filed: May 7, 2021

(65) Prior Publication Data

US 2021/0357588 A1 Nov. 18, 2021

(30) Foreign Application Priority Data

May 15, 2020 (DE) ......................... 102020206135.1

(51) Int. Cl.
| | |
|---|---|
| *G06F 17/00* | (2019.01) |
| *G06F 40/279* | (2020.01) |
| *G06N 5/02* | (2023.01) |
| *G06N 5/04* | (2023.01) |
| *G06N 20/00* | (2019.01) |

(52) U.S. Cl.
CPC ............. *G06F 40/279* (2020.01); *G06N 5/02* (2013.01); *G06N 5/04* (2013.01); *G06N 20/00* (2019.01)

(58) Field of Classification Search
CPC ........... G06F 40/30; G06F 40/279; G06F 3/16

USPC .............................................................. 704/9
See application file for complete search history.

(56) References Cited

FOREIGN PATENT DOCUMENTS

| CN | 116362247 A | * | 6/2023 | |
|---|---|---|---|---|
| JP | 2005084436 A | * | 3/2005 | |
| JP | 2005215474 A | * | 8/2005 | ............... G06F 3/16 |

OTHER PUBLICATIONS

Luan et al., "Multi-Task Identification of Entities, Relations, and Coreference for Scientific Knowledge Graph Construction," Proceedings of The 2018 Conference on Empirical Methods in Natural Language Processing, 2018, pp. 3219-3232. https://www.aclweb.org/anthology/D18-1360.pdf> Downloaded May 6, 2021.

(Continued)

*Primary Examiner* — Md S Elahee
(74) *Attorney, Agent, or Firm* — NORTON ROSE FULBRIGHT US LLP; Gerard A. Messina

(57) ABSTRACT

A device and method for determining at least one part of a knowledge graph. A body of text is made available; for one sentence from the body of text, a first, second, and third input respectively for a first, second, and third classifier is determined. Each of the first, second, and third inputs includes a numerical representation of at least one part of the sentence. A numerical representation of a first probability is determined by the first classifier as a function of the first input, which indicates whether or not the sentence relates to the knowledge graph. If the numerical representation of the first probability satisfies a first condition, a numerical representation of a second probability is determined by the second classifier as a function of the second input, which defines a first type for the word from the sentence.

11 Claims, 3 Drawing Sheets

(56) References Cited

OTHER PUBLICATIONS

Mikolov et al., "Efficient Estimation of Word Representations in Vector Space," Cornell University, ICLR Workshop, 2013, pp. 1-12. <https://arxiv.org/pdf/1301.3781.pdf> Downloaded May 6, 2021.
Tshitoyan et al., "Unsupervised Word Embeddings Capture Latent Knowledge From Materials Science Literature," Nature, vol. 571, 2019, pp. 1-12.
Heinzerling et al., "BPEMB: Tokenization-Free Pre-Trained Subword Embeddings in 275 Languages," Proceedings of the Eleventh International Conference on Language Resources and Evaluation (LREC 2018), European Language Resources Association (ELRA), 2018, pp. 2989-2993. <https://www.aclweb.org/anthology/L18-1473.pdf> Downloaded May 6, 2021.
Devlin et al., "BERT: Pre-Training of Deep Bidirectional Transformers for Language Understanding," Proceedings of The 2019 Conference of the North American Chapter of the Association for Computational Linguistics: Human Language Technologies, Association for Computational Linguistics, 2019, pp. 4171-4186. <https://www.aclweb.org/anthology/N19-1423.pdf> Downloaded May 6, 2021.
Beltagy et al., "SCIBERT: a Pretrained Language Model for Scientific Text," Proceedings of The 2019 Conference on Empirical Methods in Natural Language Processing and the 9th International Joint Conference on Natural Language Processing (EMNLP-IJCNLP), 2019, pp. 3615-3620. <https://www.aclweb.org/anthology/D19-1371.pdf> Downloaded May 6, 2021.
Xia et al., "Multi-Grained Named Entity Recognition," Proceedings of the 57th Annual Meeting of the Association for Computational Linguistics, Association for Computational Linguistics, 2019, pp. 1430-1440.
Eberts et al., "Span-Based Joint Entity and Relation Extraction With Transformer Pre-Training," Cornell University, 2019, pp. 1-8.
Wang et al., "Knowledge Graph Embedding: a Survey of Approaches and Applications," IEEE Transactions on Knowledge and Data Engineering, vol. 29, No. 12, 2017, pp. 2724-2743.

\* cited by examiner

DEVICE AND METHOD FOR DETERMINING AT LEAST ONE PART OF A KNOWLEDGE GRAPH

CROSS REFERENCE

The present application claims the benefit under 35 U.S.C. § 119 of German Patent Application No. DE 102020206135.1 filed on May 15, 2020, which is expressly incorporated herein by reference in its entirety.

BACKGROUND INFORMATION

Luan et al. 2018: Yi Luan et al.: "Multi-Task Identification of Entities, Relations, and Coreference for Scientific Knowledge Graph Construction," Conference on Empirical Methods in Natural Language Processing, 2018 describes a possibility for determining a knowledge graph from a body of text.

SUMMARY

A knowledge graph includes nodes and edges. An edge starts and ends in a node. A representation of the knowledge graph includes triples for example, each triple including one edge and the node at which the edge starts and the node at which the edge ends. A node or an edge defines one part of the knowledge graph. By virtue of a device and a method in accordance with example embodiments of the present invention, a possibility is provided for determining at least one part of the knowledge graph automatically from a body of text.

In accordance with an example embodiment of the present invention, the method for determining at least one part of the knowledge graph provides that a body of text is made available; for one sentence from the body of text, a first input for a first classifier is determined, a second input for a second classifier is determined, and a third input for a third classifier is determined; the first input includes a numerical representation of at least one part of the sentence, the second input includes a numerical representation of at least one part of a word from the sentence, the third input includes a numerical representation of at least one part of the word from the sentence; a numerical representation of a first probability is determined by the first classifier as a function of the first input, which indicates whether or not the sentence relates to the knowledge graph; if the numerical representation of the first probability satisfies a first condition, a numerical representation of a second probability is determined by the second classifier as a function of the second input, which defines a first type for the word from the sentence; a numerical representation of a third probability is determined by the third classifier as a function of the third input, which defines a second type for an edge for the word; the word from the sentence is assigned to a node of the knowledge graph of the first type and is connected to another node of the knowledge graph by an edge of the second type. This enables an automatic extraction of information from free text, i.e., text without manual annotation, for example from material science-based publications, which makes it possible to build a knowledge graph. A relation is thereby interpreted which is usually not explicitly given in the text. An edge corresponding to the relation is predicted based on the fact that the node at which the edge ends corresponds to the word of a particular first type and a particular second type. The latter defines the edge in the example. In the example, the start node of the edge corresponds to another word from the sentence, for example a word assigned to a particular first type. The edge is assigned to the two words at which it starts and ends.

Preferably, a first word of the sentence is mapped to a first numerical representation by way of a first function, the first word is mapped to a second numerical representation by way of a second function, which is different from the first function, a second word of the sentence is mapped to a third numerical representation by way of the first function, and the second word is mapped to a fourth numerical representation by way of the second function; the first numerical representation, the second numerical representation, the third numerical representation and the fourth numerical representation by way of a third function are mapped to a first tensor, which defines the first input and/or the second input. In this way, multiple words from the sentence are thus used to classify the sentence, at least two different numerical representations, i.e., embeddings, being determined for each of the words. This improves the classification of the sentence.

Preferably, training data are made available, which include a plurality of tuples; in each tuple, a sentence of the body of text is assigned a value of an in particular binary variable which defines whether the sentence relates to the knowledge graph, is assigned a first label which defines the first type, and is assigned a second label which defines the second type; and at least one parameter of the first function, the second function, the third function, the first classifier, the second classifier and/or the third classifier is trained as a function of the training data. These tuples may include words from the body of text that have been annotated by experts.

In accordance with an example embodiment of the present invention, it may be provided that training data are made available, which include a plurality of tuples; in each tuple, a sentence of the body of text is assigned a numerical representation of the first probability for this sentence, a numerical representation of the second probability for a word from the sentence, and a numerical representation of the third probability for the word from the sentence; and at least one parameter of the first function, the second function, the third function, the first classifier, the second classifier and/or the third classifier is trained as a function of the training data. These tuples may include positions of words defining words from the body of text that have been annotated by experts.

The first classifier may include a first layer which determines a vector for the sentence as a function of the first input; the first classifier includes a second layer which determines, in particular in a binary manner, the numerical representation of the first probability as a function of the vector. This enables a sentence-by-sentence classification.

The second classifier may include a first layer which determines a vector for the word from the sentence as a function of the second input; the second classifier includes a second layer which determines a plurality of numerical representations of the second probability as a function of the vector; each numerical representation of the plurality of numerical representations is assigned to one type of node for the knowledge graph. This enables sequence tagging using a predefined vocabulary which defines these types.

It may be provided that a word from the sentence from the body of text is assigned to a node of the knowledge graph when the word is assigned to a type of node of the knowledge graph. A set of nodes may thus be generated for the knowledge graph.

The third classifier may include a first layer which determines a vector for the word from the sentence as a function of the third input; the third classifier includes a second layer which determines a plurality of numerical representations of the third probability as a function of the vector; each numerical representation of the plurality of numerical representations is assigned to one type of edge for the knowledge graph. For example, the knowledge graph represents an experiment by the fact that an experiment node is assigned other nodes which represent for example materials or devices provided in the experiment. The third classifier identifies a type of edge for an edge between the experiment node and one of the other nodes. The type of edge may define a use of the material in the experiment. This enables sequence tagging using a predefined vocabulary which defines these types.

It is preferably provided that the first input, the second input and/or the third input for the sentence is determined as a function of a plurality of words from this sentence. By taking into consideration only the words from the same sentence, it is easier to determine the knowledge graph since fewer input data have to be processed.

In accordance with an example embodiment of the present invention, a device for determining at least one part of a knowledge graph is designed to execute the method.

Further advantageous specific embodiments of the present invention may be derived from the following description and the figures.

DETAILED DESCRIPTION OF EXAMPLE EMBODIMENTS

Figure 1:
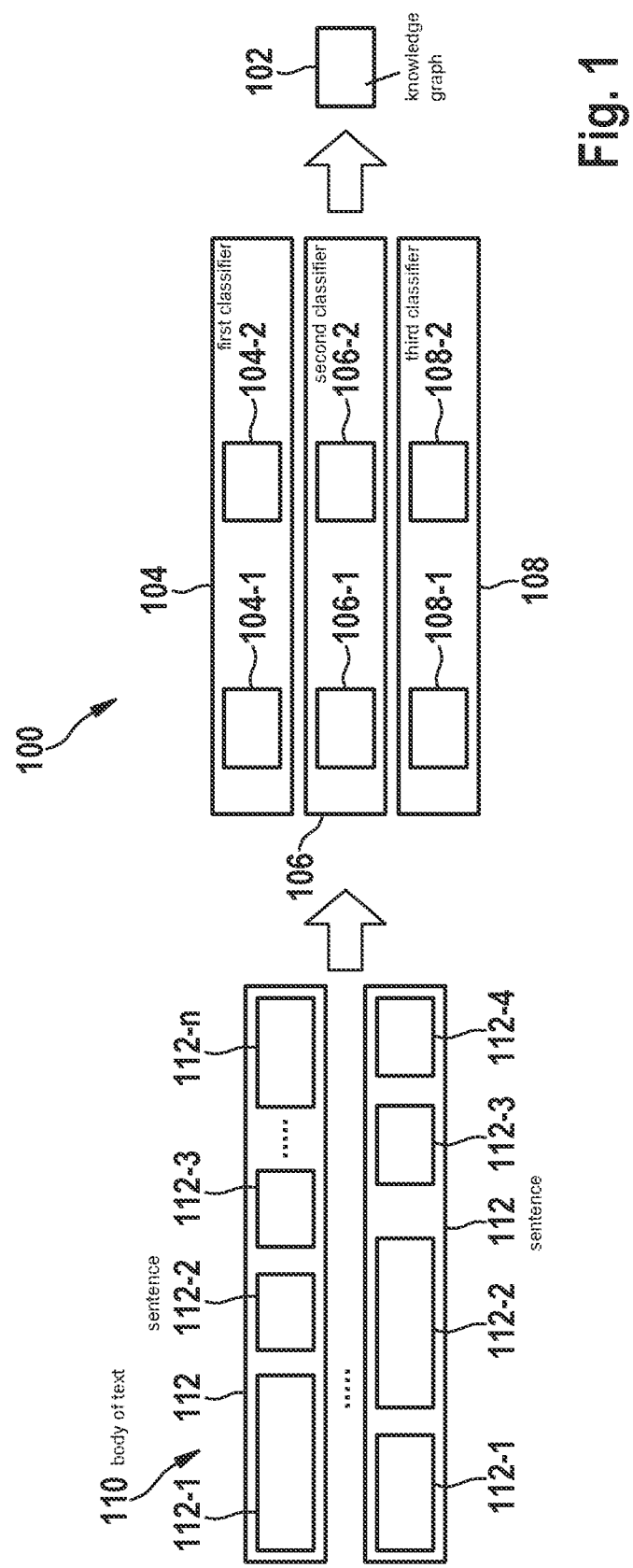
FIG. 1 shows a schematic illustration of a device for determining at least one part of a knowledge graph, in accordance with an example embodiment of the present invention.
Figure 2:
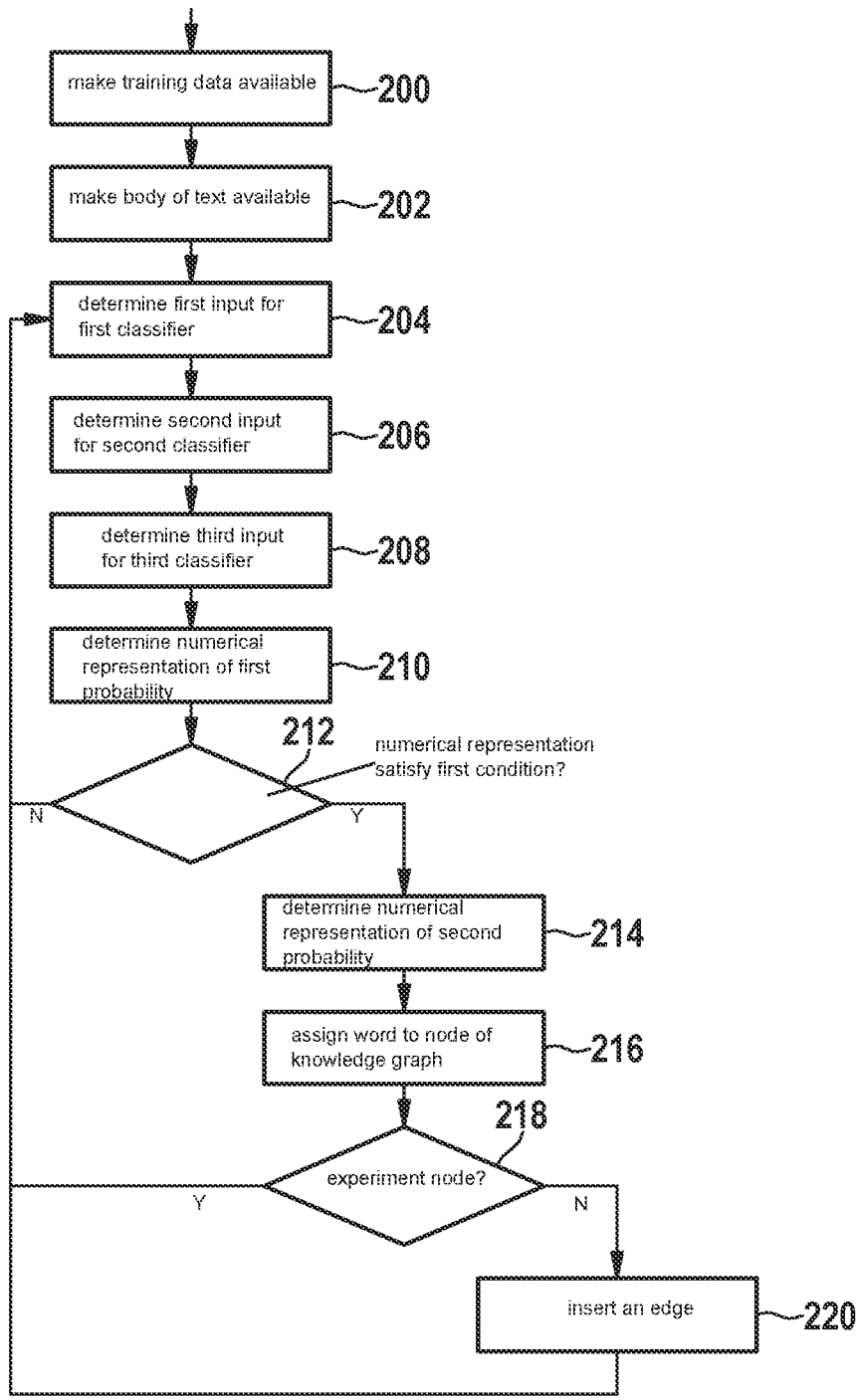
FIG. 2 shows steps in a method for determining at least one part of a knowledge graph, in accordance with an example embodiment of the present invention.

FIG. 1 schematically shows a device 100 for determining at least one part of a knowledge graph 102. Knowledge graph 102 is defined by triples, which define an edge, a node at which the edge starts, and a node at which the edge ends. One part of the knowledge graph is one node or one edge.

A procedure using the classifiers described below will be described for the following sentence:

The SOFC with Pt/SmNiO3 demonstrated dramatic power output.

A first classifier 104 identifies that the sentence is relevant, i.e. the sentence contains pieces of information which are to be written in the knowledge graph.

A second classifier 106 identifies concepts. Concepts may be of different types. In the sentence, for example, it is identified that SOFC is of the type device, Pt is of the type material, SmNiO3 is of the type material, and demonstrated is of the type verb describing the experiment. A word of the type verb describing the experiment is defined as a node in the knowledge graph, from which edges may emanate. Such nodes describing the experiment will hereinafter be referred to as experiment nodes.

In the example, all concepts identified by the second classifier will be included as nodes in the knowledge graph.

A third classifier 108 identifies that SOFC is of the type device of the experiment, Pt is of the type anode material of the experiment, and SmNiO3 is of the type fuel used for the experiment. These words define a node at which an edge emanating from the experiment node ends. The identified type defines the label of the edge.

In the knowledge graph, the SOFC node is connected to the experiment node and is written to the edge "Device." Analogously, the Pt node is connected to the experiment node and is written to the edge "Anode material."

Device 100 includes first classifier 104, second classifier 106, and third classifier 108.

Device 100 is designed to make available a body of text 110. The body of text includes a plurality of sentences 112. Each sentence 112 includes a plurality of words 112-1, . . . , 112-$n$. A number n of the words may be different in each sentence 112. For one sentence 112 from body of text 110, device 100 is designed to make available a first input for first classifier 104, a second input for second classifier 106, and a third input for third classifier 108.

First classifier 104 includes a first layer 104-1 which is designed to determine a vector for sentence 112 as a function of the first input. First classifier 104 includes a second layer 104-2 which is designed to determine a numerical representation of a first probability as a function of the vector. In the example, the classification distinguishes in a binary manner, i.e. it distinguishes between two classes. The probability itself is not binary in the example, i.e., is not 0 or 1, but instead is a numerical probability value.

Device 100 is designed to map a first word of sentence 112 to a first numerical representation by way of a first function. Device 100 may be designed to map the first word to a second numerical representation by way of a second function, which is different from the first function. The first function maps a word as a function of parameters of the first function, for example to one of the following embeddings:

word2vec, mat2vec, bpe, BERT, SciBERT.

The second function maps a word as a function of parameters of the second function, for example to another of the following embeddings:

word2vec, mat2vec, bpe, BERT, SciBERT.

To this end, in the example, an embedding layer is situated in device 100, by which words of sentence 112 may be mapped.

In the example, multiple pre-trained embedding layer types are combined, namely word2vec, mat2vec, byte-pair-encoding embeddings and BERT embeddings and SciBERT embeddings.

Word2vec is described for example in Tomas Mikolov, Kai Chen, Greg Corrado, and Jeffrey Dean, 2013, "Efficient estimation of word representations in vector space," in ICLR Workshop.

Mat2vec is described for example in Vahe Tshitoyan, John Dagdelen, Leigh Weston, Alexander Dunn, Ziqin in Rong, Olga Kononova, Kristin A. Persson, Gerbrand Ceder, and Anubhav Jain, 2019, "Unsupervised word embeddings capture latent knowledge from materials science literature," Nature, 571:95-98.

Byte-pair-encoding is described for example in Benjamin Heinzerling and Michael Strube, 2018, "BPEmb: Tokenization-free Pre-trained Subword Embeddings in 275 Languages," in Proceedings of the Eleventh International Conference on Language Resources and Evaluation (LREC 2018), Miyazaki, Japan. European Language Resources Association (ELRA).

BERT embeddings are described for example in Jacob Devlin, Ming-Wei Chang, Kenton Lee, and Kristina Toutanova, 2019, "BERT: Pre-training of deep bidirectional transformers for language understanding," in Proceedings of the 2019 Conference of the North American Chapter of the Association for Computational Linguistics: Human Language Technologies, pages 4171-4186, Minneapolis, Minnesota Association for Computational Linguistics.

SciBERT embeddings are described for example in Iz Beltagy, Kyle Lo, and Arman Cohan, 2019, "Scibert: A pretrained language model for scientific text," in Proceedings of the 2019 Conference on Empirical Methods in Natural Language Processing and the 9th International Joint Conference on Natural Language Processing (EMNLP-IJCNLP), pages 3606-3611.

The last three are subword-based embeddings, and for this reason they are suitable in particular for representing complicated long words. Mat2vec are embeddings which have been trained using the word2vec algorithm on material science-based texts, and for this reason they are suitable in particular for representing domain-specific words.

Device 100 is designed to map a second word to a third numerical representation by way of the first function. The second word is another word from the same sentence 112.

Device 100 may be designed to map the second word to a fourth numerical representation by way of the second function.

The first numerical representation and the third numerical representation may be mapped to a first tensor, which defines the first input and/or the second input, by way of a third function. It may be provided that the first numerical representation, the second numerical representation, the third numerical representation and the fourth numerical representation are mapped to the first tensor, which defines the first input and/or the second input, by way of the third function.

The third function may include a concatenation of the numerical representations, by which the first tensor is formed.

Second classifier 106 includes a first layer 106-1 which is designed to determine a vector for the word from sentence 112 as a function of the second input. Second classifier 106 includes a second layer 106-2 which is designed to determine a plurality of numerical representations of a second probability as a function of the vector.

Third classifier 108 includes a first layer 108-1 which is designed to determine a vector for the word from sentence 112 as a function of the third input. Third classifier 108 includes a second layer 108-2 which is designed to determine a plurality of numerical representations of a third probability as a function of the vector.

Device 100 is designed to assign the word from sentence 112 to a node of knowledge graph 102 when the word is assigned to a first type.

Device 100 is designed to assign the word from sentence 112 to a node at which an edge of knowledge graph 102 ends when the word is assigned to a second type.

Device 100 is designed to classify a sentence 112 from body of text 110 according to whether sentence 112 is relevant to the determination of the knowledge graph.

Device 100 is designed to execute the method described below for determining at least one part of the knowledge graph.

Device 100 may include at least one processor and at least one memory, which are designed to execute the method described below for determining at least one part of the knowledge graph.

First classifier 104 may be configured as a BiLSTM model, i.e. as a Bidirectional Long Short-Term Memory.

Second classifier 106 may be configured as a BiLSTM-CRF model, i.e. as a Bidirectional Long Short-Term Memory with a Conditional Random Field layer.

Third classifier 108 may be configured as a BiLSTM-CRF model, i.e. as a Bidirectional Long Short-Term Memory with a Conditional Random Field layer.

In the example, the method for determining at least one part of a knowledge graph 102 is executed once the classifiers have been trained. After the training, the method may also be executed independently of the training step.

In a step 200, training data are made available. In the example, the training data include a plurality of tuples.

In one aspect, in each tuple, a sentence 112 of body of text 110 is assigned a value of an in particular binary variable which defines whether the sentence relates to the knowledge graph, is assigned a first label which defines the first type, and is assigned a second label which defines the second type.

In another aspect, in each tuple, a sentence 112 of body of text 110 is assigned a numerical representation of the first probability for this sentence 112, a numerical representation of the second probability for the first type, and a numerical representation of the third probability for the second type.

In the training, at least one parameter of the first function, the second function, the third function, first classifier 104, second classifier 106 and/or third classifier 108 is trained as a function of the training data.

In the example it is provided with a gradient descent method to determine the parameters for the first function, the second function, the third function, first classifier 104, second classifier 106 and third classifier 108, for which a sum of a first deviation for the first classifier, a second deviation for the second classifier, and a third deviation for the third classifier satisfies a condition. In the example, the condition is satisfied for parameters for which a value of the sum is smaller or is the smallest value compared to other values for the sum determined using other parameters.

In the example, the first deviation is defined by a first difference between the first numerical representation, which is determined for the word from a tuple, and the associated value from the tuple.

In the example, the second deviation is defined by a second difference between the second numerical representation, which is determined for the word from the tuple, and the associated value from the tuple.

In the example, the third deviation is defined by a third difference between the third numerical representation, which is determined for the word from the tuple, and the associated value from the tuple.

The training data may be divided into parts. Step 200 may be repeated in iterations for individual parts of the training data.

In a step 202, a body of text 110 is made available.

In a step 204, for one sentence 112 from body of text 110, the first input for first classifier 104 is determined. The first input includes a numerical representation of at least one part of sentence 112.

In the example, in a step 204-11, a first word of sentence 112 is mapped to a first numerical representation by way of the first function. In a step 204-21, the first word may be mapped to a second numerical representation by way of the second function.

In the example, in a step 204-21, a second word of sentence 112 is mapped to a third numerical representation by way of the first function. In a step 204-22, the second word may be mapped to a fourth numerical representation by way of the second function.

Figure 3:
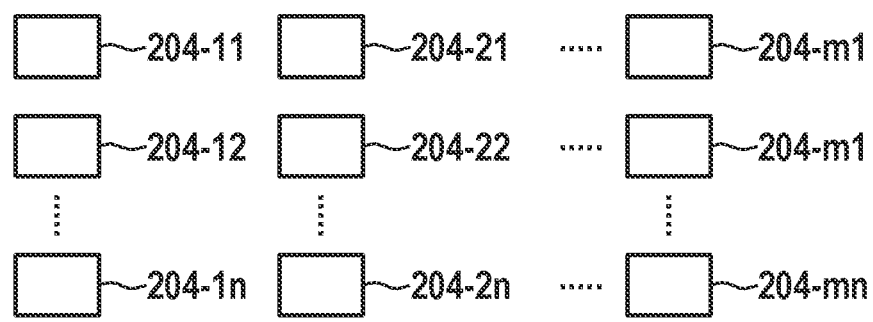
FIG. 3 shows a schematic illustration of functions for different numerical representations, in accordance with an example embodiment of the present invention.

In a step 204-3, the first numerical representation, the second numerical representation, the third numerical representation and the fourth numerical representation may be mapped to the first tensor, which defines the first input, by way of the third function. The first tensor may also be determined as a function of all n words or multiple words of the sentence. A number of m functions may be provided, by which m different numerical representations are determined for at least one part of a word. This is shown schematically in FIG. 3.

In a step 206, the second input for second classifier 106 is determined. The second input includes a numerical representation of at least one part of a word from sentence 112.

In the example, the first tensor defines the second input for second classifier 106.

In a step 208, the third input for a third classifier 108 is determined.

In the example, the third input is identical to the second input.

In a step 210, a numerical representation of a first probability is determined by first classifier 104 as a function of the first input, which indicates whether or not sentence 112 relates to knowledge graph 102.

In the example, a value of the numerical representation of the first probability is determined between 0 and 1.

In the example, by way of first layer 104-1, first classifier 104 determines a vector for sentence 112 as a function of the first input and, by way of second layer 104-2, determines the numerical representation of the first probability as a function of the vector.

For this sentence classification, an attention layer of an artificial neural network including a BiLSTM structure may calculate a sentence representation as a weighted representation of the BiLSTM hidden states, and a Softmax layer may classify in a binary classification whether or not the sentence describes a piece of information relevant to the knowledge graph.

In a step 212, a check is made as to whether the numerical representation of the first probability satisfies a first condition. In the example, the condition is satisfied if the value of the numerical representation exceeds a threshold value, i.e. if it is established that the sentence relates to the knowledge graph.

If the numerical representation of the first probability satisfies the first condition, a step 214 is executed. Otherwise, step 204 is executed for another sentence from body of text 110.

In step 214, a numerical representation of a second probability, which indicates the first type, is determined by second classifier 106 as a function of the second input.

By way of first layer 106-1, second classifier 106 determines a vector for the word from sentence 112 as a function of the second input. In the example, by way of second layer 106-2, second classifier 106 determines a plurality of numerical representations of the second probability as a function of the vector, each numerical representation of the plurality of numerical representations being assigned to one type of node for knowledge graph 102.

For a knowledge graph describing a material science-based experiment or a plurality of material science-based experiments, examples of types of node are MATERIAL, VALUE, DEVICE.

Words of the type MATERIAL contain for example a chemical formula or the name of a chemical compound such as oxide or hydrocarbon.

Words of the type VALUE contain for example an indication of value such as 750° C. or comparatives such as greater, equal to, between.

Words of the type DEVICE contain for example a label for a device such as machine, apparatus, or a domain-specific abbreviation for a device.

A numerical representation of a third probability, which indicates the second type, is determined by third classifier 108 as a function of the third input.

By way of first layer 108-1, third classifier 108 determines a vector for the word from sentence 112 as a function of the third input. By way of second layer 108-2, third classifier 108 determines a plurality of numerical representations of the third probability as a function of the vector. In the example, each numerical representation of the plurality of numerical representations is assigned to one type of edge for knowledge graph 102.

For this knowledge graph, examples of types of edges are anode material, cathode material, fuel.

Words of the type anode material contain for example word elements denoting a material that may be used as an anode.

Words of the type fuel contain for example word elements denoting a component of a fuel.

In a step 216, the first word from sentence 112 is assigned to a node of knowledge graph 102. It may be provided that the second word from sentence 112 is assigned to a node. The first word denotes for example a material which is described in the sentence. The second word denotes for example a device which is used in the experiment.

In an optional step 218, a check may be made as to whether or not the node is an experiment node. If the node is an experiment node, step 204 will be executed for another word from the sentence. Otherwise, a step 220 will be executed.

In this example, in a step 220, an edge is inserted in the knowledge graph between the node and the experiment node. The edge may be labeled with a label which is defined by the identified type of edge. Step 204 is then executed for another sentence from body of text 110.

In the example, a word from sentence 112 from body of text 110 is assigned to a node of knowledge graph 102 when the word is assigned to a corresponding first type. The node will in this case be connected to the experiment node by an edge of the second type.

In the example, the method ends when all the sentences from body of text 110 have been processed. It may also be provided that the method is executed only for a plurality of sentences from body of text 110, which are defined beforehand.

An automatic extraction of information from non-annotated, for example, material science-based publications, is thus made possible, thereby making it possible to build a knowledge graph. For this purpose, an automatic identification of relevant sentences from the body of text is provided. A sentence is relevant, for example, if the sentence describes for example a material science-based experiment. Also provided is an automatic identification of words from the sentence which are relevant as nodes in the knowledge graph. A word is relevant to a node, for example, if it describes a concept for the experiment, in particular a material science-based experiment. Examples of concepts from materials science are a material or a unit of measurement. Also provided is an automatic identification of words from the body of text which are to be connected to the experiment node by an edge in the knowledge graph. For example, an edge will be entered in the knowledge graph with a label indicating the role described by a concept in the experiment, in particular a material science-based experiment. Examples of roles from materials science are anode material, cathode material. The approach is also applicable to other domains outside of materials science. The classifiers may be designed as one or multiple models, in particular artificial neural networks, which are trained to extract information about experiments from scientific publications automatically, so that this information may be written in a knowledge graph. The first classifier may be designed as an in particular binary classification model which is trained to indicate in a binary manner for a sentence whether or not the latter is relevant to the experiment. The second classifier and the third classifier may each be implemented as a sequence tagging model. A sequence tagging model uses a plurality of predefined labels and classifies words according to which of the labels the word is most likely to be assigned. The labels for the second classifier may be types which define possible concepts. The labels for the third classifier may be types which define possible roles. Possible roles and possible concepts may be words from a collection of words which are defined for the domain assigned to the body of text. By repeating the steps for all words from the body of text, for example, a first set of concepts, i.e. words from the body of text which are relevant as nodes, and a second set of roles, i.e., words from the body of text which are relevant as nodes at which edges end, will be determined. The words thus found for nodes may be included in the knowledge graph and connected to the experiment node by an edge. The knowledge graph may then be used by domain experts to search deliberately for information and related works concerning a particular experiment.

Example embodiments of the present invention are also set forth in the numbered paragraphs below.

Paragraph 1. A method for determining at least one part of a knowledge graph (102), wherein a body of text (110) is made available (202); for one sentence (112) from the body of text (110), a first input for a first classifier (104) is determined (204), a second input for a second classifier (106) is determined (206), and a third input for a third classifier (108) is determined (208); the first input includes a numerical representation of at least one part of the sentence (112), the second input includes a numerical representation of at least one part of a word from the sentence (112), the third input includes a numerical representation of at least one part of the word from the sentence (112); a numerical representation of a first probability is determined (210) by the first classifier (104) as a function of the first input, which indicates whether or not the sentence (112) relates to the knowledge graph (102); if the numerical representation of the first probability satisfies a first condition (212), a numerical representation of a second probability is determined (214) by the second classifier (106) as a function of the second input, which defines a first type for the word from the sentence (112); a numerical representation of a third probability is determined (214) by the third classifier (108) as a function of the third input, which defines a second type for an edge for the word; the word from the sentence (112) is assigned to a node of the knowledge graph (102) of the first type and is connected (220) to another node of the knowledge graph by an edge of the second type.

Paragraph 2. The method as described in Paragraph 1, wherein a first word of the sentence (112) is mapped (204-11) to a first numerical representation by way of a first function, the first word is mapped (204-21) to a second numerical representation by way of a second function, which is different from the first function, a second word of the sentence (112) is mapped (204-12) to a third numerical representation by way of the first function, and the second word is mapped (204-22) to a fourth numerical representation by way of the second function; the first numerical representation, the second numerical representation, the third numerical representation and the fourth numerical representation are mapped (204-3) to a first tensor, which defines the first input and/or the second input, by way of a third function.

Paragraph 3. The method as described in one of the preceding Paragraphs, wherein training data are made available, which include a plurality of tuples; in each tuple, a sentence (112) of the body of text (110) is assigned a value of an in particular binary variable which defines whether the sentence relates to the knowledge graph, is assigned a first label which defines the first type, and is assigned a second label which defines the second type; and at least one parameter of the first function, the second function, the third function, the first classifier (104), the second classifier (106) and/or the third classifier (108) is trained (200) as a function of the training data.

Paragraph 4. The method as describes in one of Paragraphs 1 through 3, wherein training data are made available, which include a plurality of tuples; in each tuple, a sentence (112) of the body of text (110) is assigned a numerical representation of the first probability for this sentence (112), a numerical representation of the second probability for a word from the sentence, and a numerical representation of the third probability for the word from the sentence (112); and at least one parameter of the first function, the second function, the third function, the first classifier (104), the second classifier (106) and/or the third classifier (108) is trained (200) as a function of the training data.

Paragraph 5. The method as described in one of the preceding Paragraphs, wherein the first classifier (104) includes a first layer (104-1) which determines a vector for the sentence (112) as a function of the first input; the first classifier (104) includes a second layer (104-2) which determines the numerical representation of the first probability as a function of the vector.

Paragraph 6. The method as described in one of the preceding Paragraphs, wherein the second classifier (106) includes a first layer (106-1) which determines (214-1) a vector for the word from the sentence (112) as a function of the second input; the second classifier (106) includes a second layer (106-2) which determines (214-2) a plurality of numerical representations of the second probability as a function of the vector; each numerical representation of the plurality of numerical representations is assigned to one type of node for the knowledge graph (102).

Paragraph 7. The method as described in Paragraph 6, wherein a word from the sentence (112) from the body of text (110) is assigned (218) to a node of the knowledge graph (102) when the word is assigned to a type of node of the knowledge graph (102).

Paragraph 8. The method as described in one of the preceding Paragraphs, wherein the third classifier (108) includes a first layer (108-1) which determines a vector for the word from the sentence (112) as a function of the third input; the third classifier (108) includes a second layer (108-2) which determines a plurality of numerical representations of the third probability as a function of the vector; each numerical representation of the plurality of numerical representations is assigned to one type of edge for the knowledge graph (102).

Paragraph 9. The method as described in one of the preceding Paragraphs, wherein the first input, the second input and/or the third input for the sentence (112) is determined (208) as a function of a plurality of words from this sentence (112).

Paragraph 10. A device (100) for determining at least one part of a knowledge graph (102), wherein the device (100) is designed to execute a method as described in one of Paragraphs 1 through 9.

Paragraph 11. A computer program, wherein the computer program includes computer-readable instructions which, when executed by a computer, carries out a method as described in one of Paragraphs 1 through 9.

What is claimed is:

1. A method for determining at least one part of a knowledge graph, the method comprising the following steps:
    making available a body of text;
    for a sentence from the body of the text:
        determining a first input for a first classifier,
        determining a second input for a second classifier,
        determining a third input for a third classifier, wherein the first input includes a numerical representation of at least one part of the sentence, the second input includes a numerical representation of at least one part of a word from the sentence, and the third input includes a numerical representation of at least one part of the word from the sentence,
        determining, by the first classifier, a numerical representation of a first probability as a function of the first input, which indicates whether or not the sentence relates to the knowledge graph; and
        depending on the numerical representation of the first probability satisfying a first condition, performing:
            determining, by the second classifier, a numerical representation of a second probability as a function of the second input, which defines a first type for the word from the sentence,
            determining, by the third classifier, a numerical representation of a third probability as a function of the third input, which defines a second type for an edge for the word, and
            assigning the word from the sentence to a node of the knowledge graph of the first type and connecting the node to another node of the knowledge graph by an edge of the second type.

2. The method as recited in claim 1, wherein a first word of the sentence is mapped to a first numerical representation by way of a first function, the first word is mapped to a second numerical representation by way of a second function, which is different from the first function, a second word of the sentence is mapped to a third numerical representation by way of the first function, and the second word is mapped to a fourth numerical representation by way of the second function, wherein the first numerical representation, the second numerical representation, the third numerical representation, and the fourth numerical representation are mapped to a first tensor, which defines the first input and/or the second input, by way of a third function.

3. The method as recited in claim 2, further comprising: making available training data, which include a plurality of tuples, in each tuple of the tuples, a first sentence of the body of the text is assigned a value of a binary variable which defines whether the first sentence relates to the knowledge graph, is assigned a first label which defines the first type, and is assigned a second label which defines the second type, and at least one parameter of the first function, the second function, the third function, the first classifier, the second classifier and/or the third classifier is trained as a function of the training data.

4. The method as recited in claim 2, further comprising: making training data available, which include a plurality of tuples, wherein, in each tuple of the tuples, a first sentence of the body of the text is assigned a numerical representation of the first probability for the first sentence, a numerical representation of the second probability for a word from the first sentence, and a numerical representation of the third probability for the word from the first sentence, and at least one parameter of the first function, and/or the second function, and/or the third function, and/or the first classifier, and/or the second classifier, and/or the third classifier is trained as a function of the training data.

5. The method as recited in claim 1, wherein the first classifier includes a first layer which determines a vector for the sentence as a function of the first input, and the first classifier includes a second layer which determines the numerical representation of the first probability as a function of the vector.

6. The method as recited in claim 1, wherein the second classifier includes a first layer which determines a vector for the word from the sentence as a function of the second input, and the second classifier includes a second layer which determines a plurality of numerical representations of the second probability as a function of the vector, each numerical representation of the plurality of numerical representations is assigned to one type of node for the knowledge graph.

7. The method as recited in claim 6, wherein the word from the sentence from the body of the text is assigned to the node of the knowledge graph when the word is assigned to the type of node of the knowledge graph.

8. The method as recited in claim 1, wherein the third classifier includes a first layer which determines a vector for the word from the sentence as a function of the third input, and the third classifier includes a second layer which determines a plurality of numerical representations of the third probability as a function of the vector, each numerical representation of the plurality of numerical representations is assigned to one type of edge for the knowledge graph.

9. The method as recited in claim 1, wherein the first input, and/or the second input and/or the third input for the sentence is determined as a function of a plurality of words from the sentence.

10. A device for determining at least one part of a knowledge graph, wherein the device is configured to:
    make available a body of text;
    for a sentence from the body of the text:
        determine a first input for a first classifier,
        determine a second input for a second classifier,
        determine a third input for a third classifier, wherein the first input includes a numerical representation of at least one part of the sentence, the second input includes a numerical representation of at least one part of a word from the sentence, and the third input includes a numerical representation of at least one part of the word from the sentence,
        determine, by the first classifier, a numerical representation of a first probability as a function of the first input, which indicates whether or not the sentence relates to the knowledge graph; and if the numerical representation of the first probability satisfies a first condition:
  determine, by the second classifier, a numerical representation of a second probability as a function of the second input, which defines a first type for the word from the sentence,
  determine, by the third classifier, a numerical representation of a third probability as a function of the third input, which defines a second type for an edge for the word, and
  assign the word from the sentence to a node of the knowledge graph of the first type and connect the node to another node of the knowledge graph by an edge of the second type.

11. A non-transitory computer-readable storage medium on which is stored a computer program including computer-readable instructions, for determining at least one part of a knowledge graph, the computer program, when executed by a computer, causing the computer to perform the following steps:
  making available a body of text;
  for a sentence from the body of the text:
    determining a first input for a first classifier,
    determining a second input for a second classifier,
    determining a third input for a third classifier, wherein the first input includes a numerical representation of at least one part of the sentence, the second input includes a numerical representation of at least one part of a word from the sentence, and the third input includes a numerical representation of at least one part of the word from the sentence,
  determining, by the first classifier, a numerical representation of a first probability as a function of the first input, which indicates whether or not the sentence relates to the knowledge graph; and
  if the numerical representation of the first probability satisfies a first condition, performing:
    determining, by the second classifier, a numerical representation of a second probability as a function of the second input, which defines a first type for the word from the sentence,
    determining, by the third classifier, a numerical representation of a third probability as a function of the third input, which defines a second type for an edge for the word, and
    assigning the word from the sentence to a node of the knowledge graph of the first type and connecting the node to another node of the knowledge graph by an edge of the second type.

* * * * *